United States Patent
Morbitzer et al.

(10) Patent No.: US 7,076,865 B2
(45) Date of Patent: Jul. 18, 2006

(54) MANUFACTURING SYSTEM AND METHOD

(75) Inventors: Hans-Peter Morbitzer, Atzenbrugg (AT); Josef Reithofer, Wolfpassing (AT)

(73) Assignee: Electrovac, Fabrikation elektrotechnischer Spezialartikel Gesellschaft m.b.H., Klosterneuburg (AT)

( * ) Notice: Subject to any disclaimer, the term of this patent is extended or adjusted under 35 U.S.C. 154(b) by 75 days.

(21) Appl. No.: 10/431,267

(22) Filed: May 7, 2003

(65) Prior Publication Data

US 2003/0208903 A1 Nov. 13, 2003

(30) Foreign Application Priority Data

May 10, 2002 (AT) .......................................... A 726/2002

(51) Int. Cl.
*B23P 19/00* (2006.01)

(52) U.S. Cl. .......................... 29/799; 29/791; 29/33 P; 29/430; 29/431; 29/822; 29/823; 29/824; 414/222.13

(58) Field of Classification Search .................. 29/809, 29/822, 823, 824, 430, 431, 612, 709–711, 29/714, 33 P, 783, 791, 799, 701; 414/331.01, 414/331.04, 222.08, 222.13
See application file for complete search history.

(56) References Cited

U.S. PATENT DOCUMENTS 4,783,904 A * 11/1988 Kimura ........................ 29/786
5,125,149 A * 6/1992 Inaba et al. ................... 29/430
5,232,331 A * 8/1993 Kasai et al. ................. 414/802
5,271,490 A * 12/1993 Sticht .......................... 198/349
5,310,396 A * 5/1994 Momoi et al. ................ 483/15
5,371,679 A * 12/1994 Abe et al. .................... 700/113
5,737,827 A * 4/1998 Kuse et al. ................... 29/701
6,524,052 B1 * 2/2003 Yamauchi et al. ........ 414/331.1
6,623,231 B1 * 9/2003 Elger ..................... 414/331.01
6,654,663 B1 * 11/2003 Jokela ......................... 700/230

FOREIGN PATENT DOCUMENTS

| AT | 402 619 B | | 7/1997 |
|---|---|---|---|
| DE | 3431349 | * | 3/1986 |
| DE | 3706122 | * | 9/1988 |
| EP | 0 238 838 | | 9/1987 |
| EP | 0 606 515 B1 | | 1/1999 |
| EP | 0 738 679 | | 10/1999 |
| JP | 61-086164 | * | 5/1986 |
| JP | 04-164542 | * | 6/1992 |

* cited by examiner

Primary Examiner—Eric Compton
(74) Attorney, Agent, or Firm—Henry M. Feiereisen

(57) ABSTRACT

A manufacturing system for assembly of component parts to produce an article includes a plurality of separate process modules for executing the various process steps, and a plurality of magazine units, which can be coupled to the process modules, for storage and transport of article components produced in the process steps. The process modules have a substantially identical base structure which can be suited to the respective process steps.

5 Claims, 4 Drawing Sheets

MANUFACTURING SYSTEM AND METHOD

CROSS-REFERENCES TO RELATED APPLICATIONS

This application claims the priority of Austrian Patent Application, Serial No. A 726/2002, filed May 10, 2002, pursuant to 35 U.S.C. 119(a)–(d), the disclosure of which is incorporated herein by reference.

BACKGROUND OF THE INVENTION

The present invention relates to a manufacturing system and method for assembly of component parts to produce a finished article, e.g. a temperature sensor.

The manufacture of a finished article through several process steps involves the use of individual manufacturing sections having machines or system parts that are specifically constructed for this purpose and form a manufacturing chain through which each article being produced is advanced. Each link of this manufacturing chain is hereby supplied from a preceding machine in the manufacturing chain with component parts that are further processed in the respective process step or new components are added to a semi-finished article, so that the degree for finishing the article progressively increases from process step to process step. The component parts, respectively produced during a process step, are transferred in the manufacturing chain to the next following machine. As a result, each production unit of the manufacturing chain is directly coupled to the preceding production unit, so that the quantity of article components outputted from this production unit must continuously be processed by the next following production unit.

Articles of complex configuration require a great number of individual process steps, whereby each process step requires construction of a separate machine or system to carry out the manipulations of the component parts. Such steps involve in particular the addition of component parts to the respective semi-finished article, whereby processes, such as welding, screwing, soldering, riveting, stamping or the like, are employed. Optionally, there are, however, also checking and adjusting steps between these processes to make sure that manufacturing tolerances are observed and the finished article properly operates.

As a consequence of the sequential operation, the entire manufacturing chain is impacted when a link in the manufacturing chain breaks down, so that the production comes to a standstill because the system, affected by the breakdown, can no longer process the supplied component parts, and an excess accumulation of those component parts, which are produced in the manufacturing chain in the preceding systems, is encountered as the production chain has been configured for a continuous production.

It would therefore be desirable and advantageous to provide an improved manufacturing system which obviates prior art shortcomings and which realizes a standardization of the system, provided for the individual process steps and permits the realization of shorter system downtimes and continuation of the production, even when individual system sections, responsible for the process steps fail.

It would also be desirable and advantageous to provide an improved manufacturing system which allows an expansion of the production capacity in a simple manner.

SUMMARY OF THE INVENTION

According to one aspect of the present invention, a manufacturing system for the assembly of component parts to produce an article, in particular a temperature sensor, includes a plurality of separate process modules for carrying out process steps for manufacture of component parts of the article, with the process modules being constructed to suit the process steps, and a plurality of magazine units constructed for connection to the process modules for storage and transport of components produced in the process steps.

The present invention resolves prior art problems by providing a complete manufacturing chain on the basis of individual process modules that can be expanded, in combination with magazine units to provide a buffer function in the event of a breakdown of a process module. Suitably, the process modules may have a substantially identical base structure.

As the individual process steps use, e.g., always the same process modules, or the construction and/or equipment of the process modules only have to be suited to the respective process step, it is only essentially necessary to construct a single process module so that the exchange of process modules provided for the individual process steps is significantly simplified compared to conventional systems. The cost-intensive development and construction of special machines for the individual process steps is hereby eliminated. The number and type of the process steps can be altered in a cost-efficient manner by the modular structure of the system according to the invention.

The magazine units that can be coupled to the process modules enable each individual process module to build up stock until a breakdown of another process module in the manufacturing chain has been fixed. As the size or number of the magazine units is freely selectable, fluctuations in the workload of the system according to the invention can be compensated.

According to another feature of the present invention, each process module is provided for execution of a respective process step. In this way, the entire manufacturing system can be suited in each individual process step at any time to the actual demands of the production. The replacement of a process module is hereby also simplified.

According to another feature of the present invention, the magazine units may be shiftable between the separate process modules. Thus, the component parts produced by the process modules can be deposited in the magazine units and transferred to the process modules following in the manufacturing chain. It is, however, also within the scope of the invention to move the magazine units in different fashion. When one of the process modules fails, the component parts produced by the other process modules can be deposited in the existent magazine units until the failed process module resumes the production, whereby the number of the available magazine units for such breakdowns is adjusted accordingly.

In accordance with another feature of the present invention, the capacity of the magazine units can be made highly variable by forming the magazine units through pallet magazines with pallets loosely stacked upon one another.

The invention further relates to a process module for a manufacturing system for assembly of component parts to produce a finished article, in particular a temperature sensor, whereby the components are, optionally, checked. The construction of a manufacturing system according to the invention requires a process module which is standardized as far as substantial components is concerned and thus can be suited in a simple manner to the respectively required process step for which it is intended. Process modules known heretofore can be used only for a very limited number of different production operations.

It would therefore be desirous and advantageous, to provide an improved process module which enables a highest possible degree of standardization and is accessible for a wide range of applications.

According to this aspect of the present invention, a process module for use in a manufacturing system for assembly of component parts to produce an article, in particular a temperature sensor, includes at least one processing device for joining and/or holding a plurality of component parts; and at least one robot unit for moving the components parts between different locations. As a consequence, each process step, whether relating to the assembly or the inspection of component parts, can be traced back to the processes of joining and/or holding of article components as well as to the manipulations of article components or supplied component parts. The device for joining and/or holding is suited to the respective process step, and the robot unit is adjusted to execute the movements through programming. The manufacturing costs for the structure of the production line can be greatly lowered because only the particular core elements of the process modules according to the invention require special construction. Operation and maintenance of the process modules as well can be improved by the substantially uniform structure of the process module according to the invention. A multiplication of the production capacity to individual process steps can be realized in a simple matter as a result of clock time requirements.

According to another feature of the present invention, there may be provided a base plate for support of the at least one processing device for joining and/or holding of component parts and the at least one robot unit. In this manner, a stable fixation of the processing device and the robot unit is possible upon the process module according to the invention.

According to another feature of the present invention, the process module may include a measuring and checking unit for inspection and adjustment of component parts and thus for monitoring a quality of the component parts being produced.

According to another feature of the present invention, there may be provided a receptacle for installation of a supply module, e.g., an electric supply module, pneumatic supply module, vacuum supply module or cooling supply module or the like, in order to render the application of the process module as variable as possible.

Control and supervision of the process modules according to the invention is implemented by independent electronic systems which can be networked to evaluate process data. Suitably, the process module according to the invention may include a unit for autonomous control and inspection which can be networked with other process modules for process data evaluation.

According to another feature of the present invention, the process module may include connection elements for connection with other process modules to thereby enable a union of several process modules to form a module group.

According to another feature of the present invention, the process module may be provided with a protective jacket which shields or safeguards against outer influences and may act, optionally, as sound protection measure.

In accordance with another feature of the present invention, the process module may include a transport unit by which its position can be changed, without the application of load cranes. A rapid displacement of the process module according to the invention after a production inspection or after a test operation as well as a simple modification for process expansions is easy to implement.

According to another feature of the present invention, the process module may include interfaces and/or terminals for connection external devices, required for the production of component parts.

According to another feature of the present invention, the process module may be subdivided in modular functional units with a modular dimension, wherein a detail function or a detail function group, e.g. magazine lift, component feed or the like, is assigned to each of the modular functional units, and wherein the modular functional units interact by at least the one robot unit or the like. As a consequence, functional elements within a modular functional unit can be constructed and developed independently of the respective other functional groups, without affecting the other functional groups or being affected by other functional groups of the process module. A process module can thus be conceived through combination of individual functional modular units in a rapid and simple manner. The modular dimension realizes a clear arrangement of the functions and a simple determination of the process module dimensions is possible. Moreover, the determination of particular costs of the functional module units enables a quick ascertainment of the investment for process modules and overall manufacturing devices.

According to another aspect of the present invention, a method for continuously processing component parts for making an article, includes the steps of (a) assembling a component part in a process module, (b) transferring the assembled component part to an adjacent intermediate storage magazine, (c) repeating steps (a) and (b) for filling the storage magazine with assembled component parts, and (d) moving the filled storage magazine to a further process module for transfer of assembled component parts to the further process module for further processing of the component parts, with the storage magazine assuming a buffer function to maintain a continuous assembly process, when one of the process modules breaks down.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
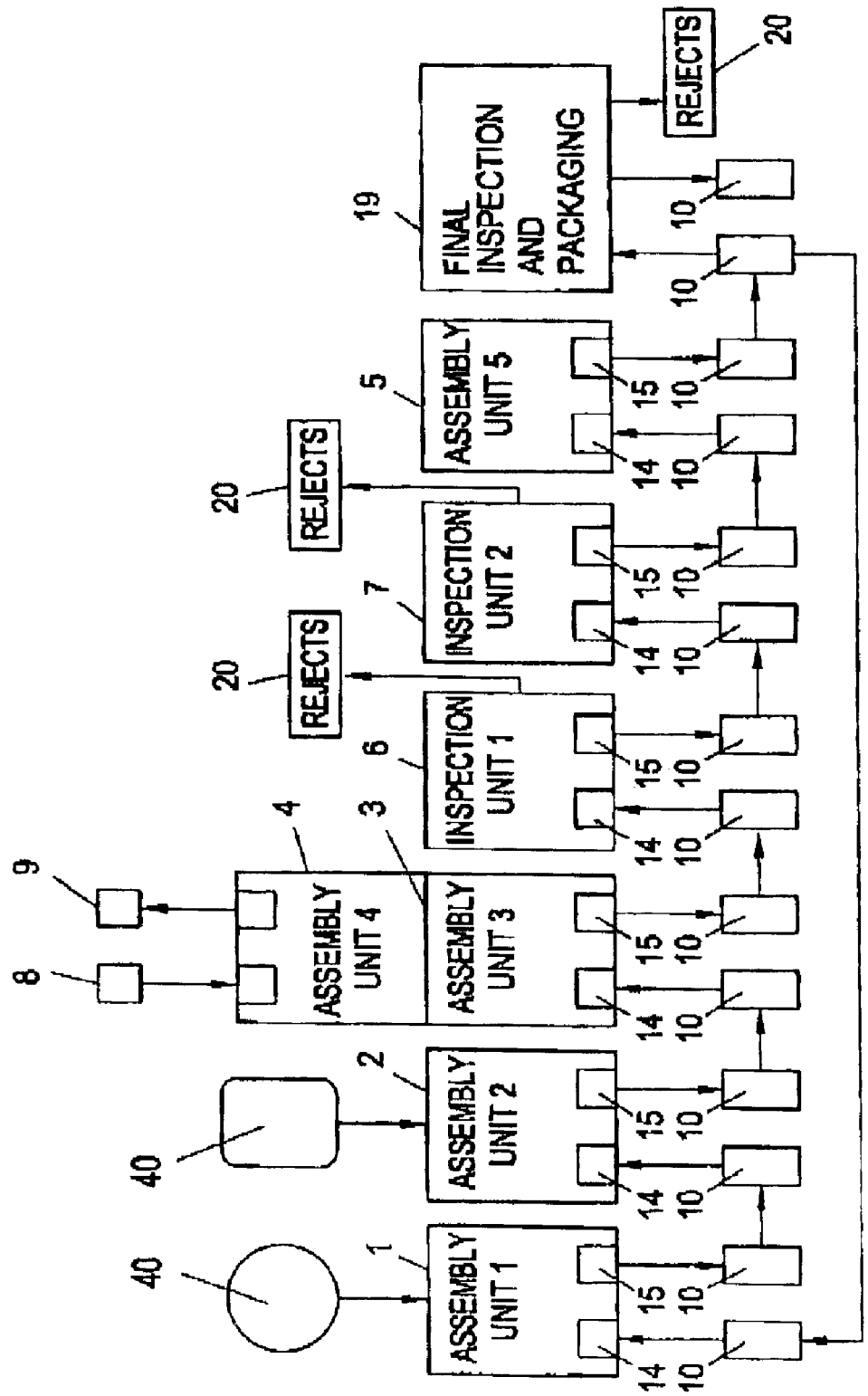
FIG. 1 is a schematic illustration of a manufacturing system according to the invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a schematic illustration of a manufacturing system according to the invention for assembly of a finished article, e.g. a temperature sensor, comprised of several individual component parts which are assembled in the course of several process steps and, optionally, checked. The manufacturing system includes a plurality of separate process modules 1, 2, 3, 4, 5, 6, 7 for execution of process steps, and a plurality of magazine units 10, which can be coupled to the process modules 1, 2, 3, 4, 5, 6, 7, for storage and transport of article components produced in the individual process steps, whereby the process modules 1, 2, 3, 4, 5, 6, 7 have a basic structure as far as construction and/or equipment are concerned which can be suited to the respective process steps. The term "process step" relates hereby to any step required for manufacture. In particular, assembly and checking steps are also included under this definition. This basic structure may be the same for each module whereby the configuration may include a simple exploitation of individual equipments, or equipment exchange, or equipment additions, or a programming (software) that is suited to the process step. As an alternative, individual equipments may also be exchanged or complemented by further equipments.

After passing through the individual process modules 1, 2, 3, 4, 5, 6, 7, a finished article is obtained which is made from individual component parts and is ultimately fed to a unit for final inspection and packaging 19 where the finished article is inspected and finally packaged. The fraction of produced articles which does not satisfy the inspection criteria is discarded to a collecting unit 20. Such collecting units 20 may also be provided in the area of each process module 1, 2, 3, 4, 5, 6, 7 to receive rejects.

The magazine units 10 with the stored article components are freely movable, e.g. shiftable, between the separate process modules 1, 2, 3, 4, 5, 6, 7; this may also be carried out automatically. They may, however, be movable between the process modules 1, 2, 3, 4, 5, 6, 7 also in a different manner.

In order to allow adjustment to the respective actual production numbers, the magazine units 10 are constructed to have flexible storage capacity. This may be implemented in a simple manner by forming the magazine units through pallet magazines 31 (FIG. 2) with loosely stacked pallets. In this way, a randomly selected number of pallets can be combined to magazine unit 10. Of course, any alternative configuration of magazine unit, known to the artisan is conceivable as well.

The individual process modules 1, 2, 3, 4, 5, 6, 7 are so variably constructed that a randomly designed manufacturing chain can be formed, on one hand, and two or more process modules can be combined to a single structure, on the other hand. FIG. 1 shows an interconnection of the process modules 3, 4 via connection elements to form together a common process module. The components required for manufacture are supplied to the process module 4 via feed assemblies 8, 9. Suitably, each process module 1, 2, 5, 6, 7 as well as the joined process modules 3, 4 are provided to respectively carry out one process step.

The process module 1, 2, 5, 6, 7 as well as the interconnected process modules 3, 4 have each a magazine inlet 14 and a magazine outlet 15 for attachment of the magazine units 10. This may be implemented by mechanisms known to the artisan. Supplied from the magazine units 10 via the magazine inlet 14 of each process module are those article components which have been partially finished by the respectively preceding process step in the manufacturing chain. After carrying out the respective process step, the thus produced article components are discharged via the outlet 15 to the magazine units 10 which, as soon as they are full, are shifted to the inlet 14 of the neighboring process module following in the manufacturing chain for transfer of the partially finished articles.

A failure of one of the process modules 1, 2, 3, 4, 5, 6, 7 will not result in a breakdown of the entire manufacturing chain as a consequence of the buffer option the magazine units 10 afford. Thus, the process modules which are not affected by the failure may continue to produce into their magazine units 10 situated at the outlets 15 until the idle process module resumes operation.

Figure 2:
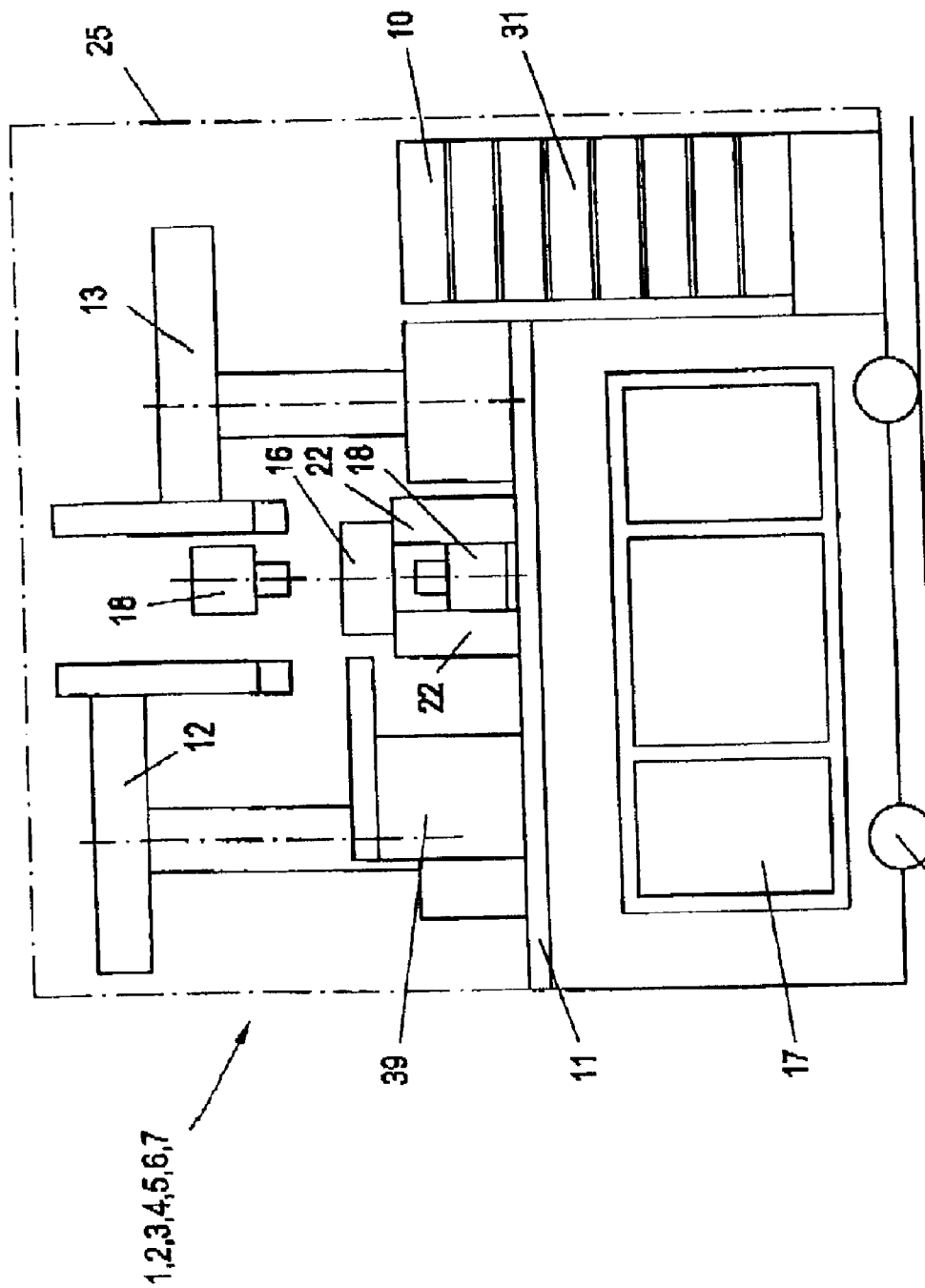
FIG. 2 is a vertical projection of a first variation of a process module according to the invention for integration in a manufacturing system.
Figure 3:
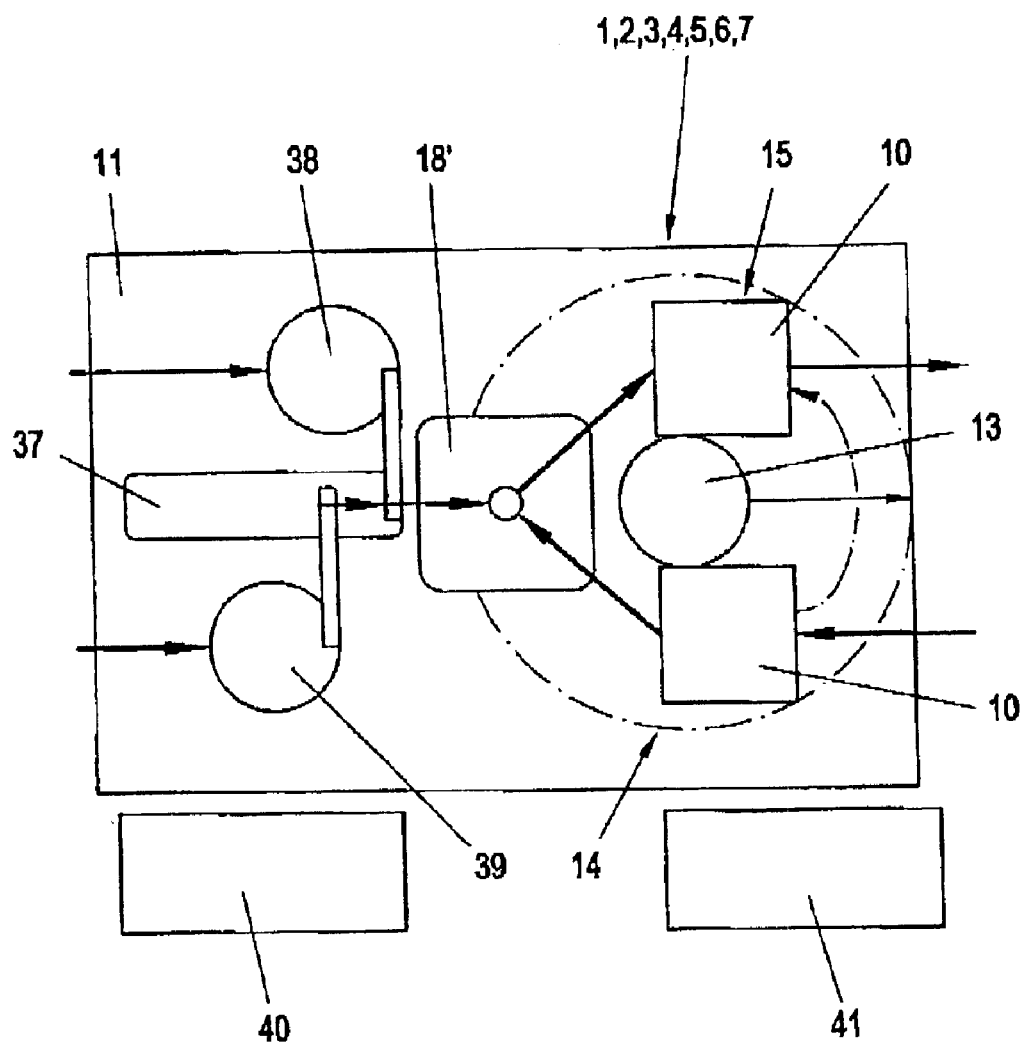
FIG. 3 is a plan view of a second variation of a process module according to the invention.

The configuration of the process modules 1, 2, 3, 4, 5, 6, 7 is shown in more detail in FIGS. 2 and 3 with reference to two exemplified embodiments. As shown in FIG. 2, each process module 1, 2, 3, 4, 5, 6, 7 has a box-shaped substructure and includes a receptacle 17 for installation of a supply module e.g., an electric supply module, pneumatic supply module, vacuum supply module or cooling supply module or the like. Machines or system parts, which are required for the manufacturing process in the respective process module 1, 2, 3, 4, 5, 6, 7, can be respectively supplied by such a supply module. The box-like substructure of the process module 1, 2, 3, 4, 5, 6, 7 is closed on top by a base plate 11. Preferably, each process module 1, 2, 3, 4, 5, 6, 7 includes a transport means 30 (FIG. 2), e.g. wheels at the underside, with fastening elements for a stationary operation.

The entire process module 1, 2, 3, 4, 5, 6, 7 is enclosed for protecting the operating personnel from injury through moving elements of the device by a transparent protective jacket 25 which has sound-absorbing function, on one hand, and prevents a penetration of particles, such as dust or chips, into the process module 1, 2, 3, 4, 5, 6, 7, on the other hand. The protective jacket 25 also prevents a release of such particles from the process module 1, 2, 3, 4, 5, 6, 7 into the environment.

Of course, the constructive configuration of the process modules 1, 2, 3, 4, 5, 6, 7 can be modified or complemented to suit the process step to be executed by a process module.

As far as equipment is concerned, each of the process modules 1, 2, 3, 4, 5, 6, 7 includes, e.g. a processing device for joining and/or holding of article components 18, 22, and a robot unit 12 for manipulation of article components or other components that are arranged on the base plate 11. In addition, there may be provided a further robot unit 13. If need be, there may be attached any number of robot units upon the process module. The device for joining and/or holding of article components is implemented in FIG. 2 by a fixed and a movable stamping block 18. Holding of an article component 16 is realized by support elements 22. Instead of the stamping block 18, it is also possible to provide e.g. a welding article, soldering article or screwing article or the like but also a measuring and checking unit.

Depending on the equipment being installed, the process modules may be used, e.g., for assembly or inspection of article components.

The robot unit 13 removes, e.g. from the magazine 10, the article component 16 and moves it to the support elements 22. A component part is removed again by the robot unit 12 from the component part magazine 39 for placement upon the article component. Subsequently, the stamping operation is carried out through movement of the movable stamping block 18. After conclusion of the stamping process, the article component 16 is deposited in a further magazine 10.

In FIG. 1, the process modules 1, 2, 5 as well as 3 and 4 are used as assembly units and the process modules 6, 7 are used as inspection units, whereby the device for joining and/or holding is modified in correspondence with the respective manufacturing stage.

Finally, each process module 1, 2, 3, 4, 5, 6, 7 includes a unit for autonomous control and supervision which can be networked with other process modules for process data evaluation.

In the embodiment according to FIG. 3, there is provided a central device for joining and/or holding of article components 18' which is supplied by a linear feed unit 37 with component parts, required for production, from two component part magazines 38, 39. One magazine unit 10 is respectively provided in the magazine inlet 14 and one magazine unit 10 is respectively provided in the magazine outlet 15. The robot unit 13 removes from the magazine 10, located in the magazine inlet 14, an article component, supplied from another process module, for transport to the device for joining and/or holding of article components 18' to carry out the process step pertaining to this process module. After supply of component parts from the component part magazines 38, 39, the actual step of joining the component parts with the article component is implemented. After this step is concluded, the article component is moved to the magazine 10 at the magazine outlet 15 to wait there for further transport to the process module following in the manufacturing chain.

To expand the manufacturing options, the process modules 1, 2 are further provided with interfaces and/or terminals for external devices 40 for connection of these external devices, which may include switch boxes, supply power connections, special aggregates or the like, with the process module.

Figure 4:
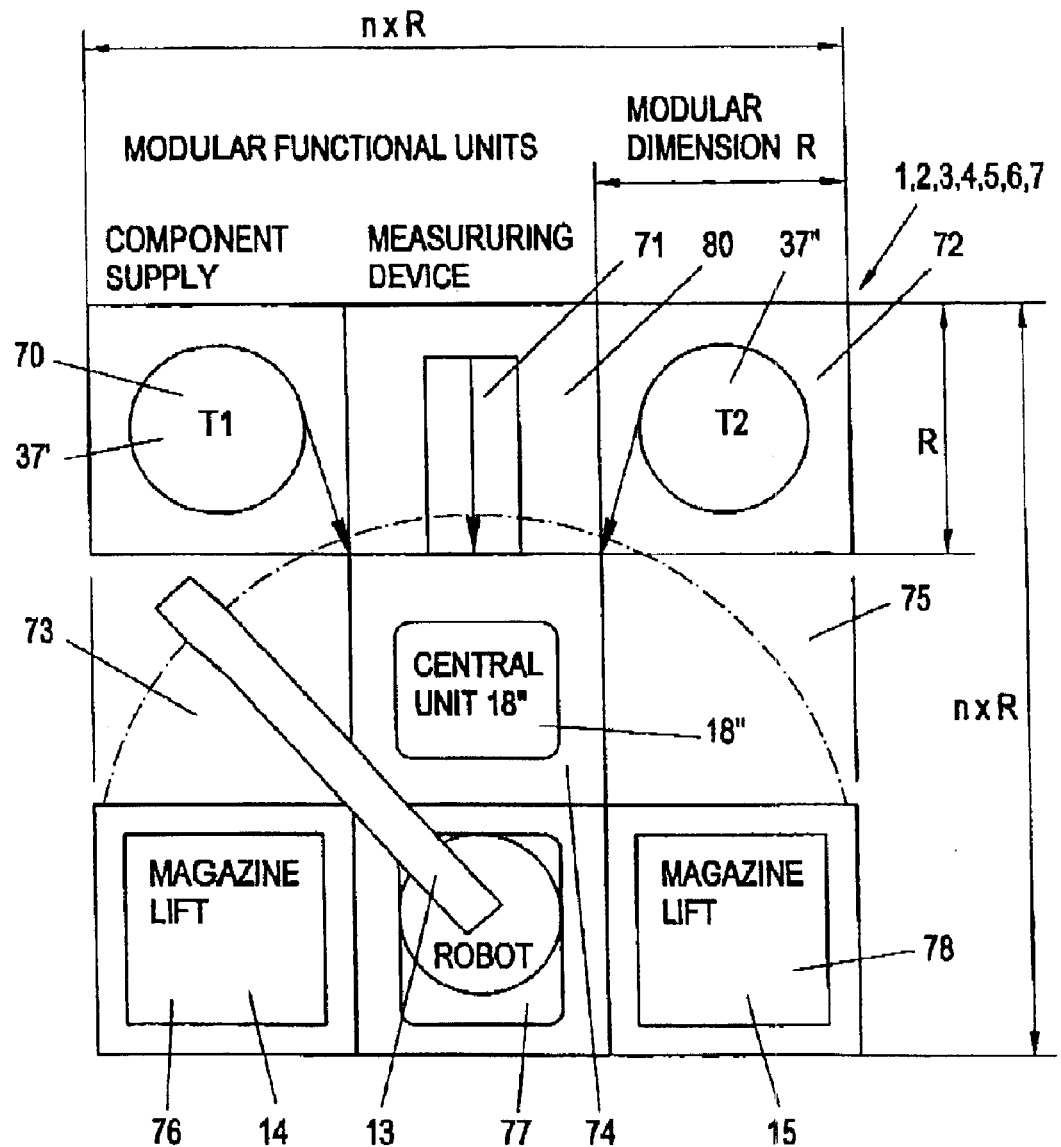
FIG. 4 is a plan view of a third variation of a process module according to the invention.

FIG. 4 shows another embodiment of a process module, whereby each of the process modules 1, 2, 3, 4, 5, 6, 7 is subdivided into modular functional units 70, 71, 72, 73, 74, 75, 76, 77, 78 with a modular dimension R, wherein a detail function or a detail function group, e.g. magazine lift, component supply or the like, is assigned to the modular functional units 70, 71, 72, 73, 74, 75, 76, 77, 78, and wherein the modular functional units 70, 71, 72, 73, 74, 75, 76, 77, 78 interact through the robot unit 13. The function of the robot unit 13 may also be assumed by other functional units with comparable functionality. It is also within the scope of the invention to subdivide only one or more process modules in modular functional units.

In the exemplified embodiment according to FIG. 4, a total of nine modular functional units 70, 71, 72, 73, 74, 75, 76, 77, 78, which are each formed in plan view by a square with a side length R, are combined to a process module. Of course, any other suitable number of modular functional units can be united to a process module.

The modular units 70, 72 form each a component supply 37', 37", the modular units 76, 78 form a magazine inlet 14 and a magazine outlet 15, respectively. The modular unit 77, placed in-between, accommodates the robot unit 13 by which the handling is realized to the other modular units 70, 71, 72, 73, 74, 75, 76, 78. Furthermore, there is provided a central unit 18" for joining in the modular unit 74. In addition, a measuring device 80 is configured for integration in the modular unit 71. The height of the 70, 71, 72, 73, 74, 75, 76, 77, 78 is preferably also uniformly selected, but may be—if necessary—also disposed in offset relationship. Composition of a process module can be changed in this manner in a quick, efficient and random manner.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A manufacturing system for the assembly of component parts to produce an article along a manufacturing chain, in particular a temperature sensor, comprising:

a plurality of separate and successive process modules for carrying out sequential process steps for manufacture of component parts of the article, wherein each process module is constructed for carrying out a single process step of the manufacturing chain; and a plurality of magazine units constructed for movement between the process modules and connection to the process modules for storage and transport of components produced in the process steps, wherein each of the process modules is constructed for cooperation with two magazine units, with one of the two magazine units intended for supply of component parts produced in a previous process module, and the other one of the two magazine units intended for receiving component parts produced in said process module.

2. The system of claim 1, wherein the process modules have a substantially identical base structure.

3. The system of claim 1, wherein the magazine units are transferable between the process modules.

4. The system of claim 1, wherein the magazine units are formed by a plurality of pallet magazines with loosely stacked pallets.

5. A method for continuously processing component parts for making an article along a manufacturing chain, comprising the steps of:

(a) moving a first storage magazine filled with component parts to a first location of a first process module;

(b) transferring a component part from the first storage magazine;

(c) subjecting the component part in the first process module to a process step;

(d) transferring the produced component part to an adjacent second storage magazine at a second location of the first process module;

(c) repeating steps (b) to (d) for filling the second storage magazine with produced component parts and emptying the first storage magazine; and (d) moving the filled second storage magazine to a first location of a second process module for transfer of the produced component parts to the second process module for carrying out a next process step of the manufacturing chain, while the previously emptied first storage magazine is moved to the second location of the first process module, wherein each of the storage magazines assumes a buffer function to maintain a continuous assembly process, when one of the process modules breaks down.

* * * * *